(12) United States Patent
Thrush

(10) Patent No.: US 9,289,085 B2
(45) Date of Patent: Mar. 22, 2016

(54) FLOOR MATTING

(71) Applicant: Parallax Group International, LLC, San Juan Capistrano, CA (US)

(72) Inventor: Bruce A. Thrush, San Juan Capistrano, CA (US)

(73) Assignee: PARALLAX GROUP INTERNATIONAL, LLC, San Juan Capistrano, CA (US)

( * ) Notice: Subject to any disclaimer, the term of this patent is extended or adjusted under 35 U.S.C. 154(b) by 0 days.

(21) Appl. No.: 14/630,232

(22) Filed: Feb. 24, 2015

(65) Prior Publication Data

US 2015/0164258 A1 Jun. 18, 2015

Related U.S. Application Data

(63) Continuation of application No. 11/105,182, filed on Apr. 13, 2005, which is a continuation-in-part of application No. 29/203,027, filed on Apr. 8, 2004, now Pat. No. Des. 532,238.

(51) Int. Cl.

| | |
|---|---|
| *A47G 27/02* | (2006.01) |
| *B32B 3/02* | (2006.01) |
| *B32B 3/06* | (2006.01) |
| *B32B 3/26* | (2006.01) |
| *B32B 3/30* | (2006.01) |
| *B32B 5/18* | (2006.01) |
| *B32B 5/32* | (2006.01) |
| *B32B 25/04* | (2006.01) |

(Continued)

(52) U.S. Cl.
CPC .............. *A47G 27/0218* (2013.01); *B32B 3/02* (2013.01); *B32B 3/06* (2013.01); *B32B 3/10* (2013.01); *B32B 3/263* (2013.01); *B32B 3/30* (2013.01); *B32B 5/18* (2013.01); *B32B 5/32* (2013.01); *B32B 25/04* (2013.01); *B32B 25/14* (2013.01); *E01C 13/045* (2013.01); *E04F 15/10* (2013.01); *B32B 2250/02* (2013.01); *B32B 2250/22* (2013.01); *B32B 2266/025* (2013.01); *B32B 2266/0221* (2013.01); *B32B 2266/0278* (2013.01); *B32B 2307/404* (2013.01); *B32B 2471/04* (2013.01); *E01C 2201/14* (2013.01); *E04F 2201/095* (2013.01); *Y10T 428/24612* (2015.01)

(58) Field of Classification Search
CPC ............ B32B 3/02; B32B 3/263; B32B 3/30; Y10T 428/24612
USPC ................ 428/99, 98; 52/590.2, 590.1, 589.1
See application file for complete search history.

(56) References Cited

U.S. PATENT DOCUMENTS

| | | | |
|---|---|---|---|
| 3,793,128 | A | 2/1974 | Chancellor, Jr. |
| 3,909,996 | A | 10/1975 | Ettlinger, Jr. et al. |

(Continued)

FOREIGN PATENT DOCUMENTS

| | | | | |
|---|---|---|---|---|
| GB | 2000726 A | 1/1979 | | |
| WO | 03000994 A1 | 1/2003 | | |
| WO | WO 03000994 A1 * | 1/2003 | .............. | E01C 13/06 |

*Primary Examiner* — Brent O'Hern
(74) *Attorney, Agent, or Firm* — Fish & Tsang LLP

(57) ABSTRACT

Floor mats comprising two layers bonded together with an undulating boundary between them. The surface color and/or surface texture of the first layer being different from the surface color and/or surface texture of the second layer. The mats having an interlocking periphery boundary adapted so the mats can be interlocked with adjoining mats to form a continuous planar mat flooring.

16 Claims, 2 Drawing Sheets

(51) Int. Cl.
  *B32B 25/14* (2006.01)
  *E01C 13/04* (2006.01)
  *E04F 15/10* (2006.01)
  *B32B 3/10* (2006.01)

(56) References Cited

U.S. PATENT DOCUMENTS

| | | |
|---|---|---|
| 4,287,693 A | 9/1981 | Collette |
| 4,336,293 A | 6/1982 | Eiden |
| 4,377,614 A | 3/1983 | Alfter et al. |
| 4,973,505 A | 11/1990 | Bielous |
| 5,052,158 A | 10/1991 | D'Luzansky |
| 5,212,842 A | 5/1993 | Glydon |
| 5,358,766 A | 10/1994 | Field |
| 6,333,092 B1 | 12/2001 | Gipple et al. |
| 6,526,705 B1 | 3/2003 | MacDonald |
| 6,578,324 B2 | 6/2003 | Kessler et al. |
| 6,588,167 B2 | 7/2003 | Chang |
| 6,623,840 B2 | 9/2003 | Hainbach |
| 6,810,834 B2 | 11/2004 | Hutchings et al. |
| 6,966,155 B2 | 11/2005 | Nevison |
| 7,340,865 B2 | 3/2008 | Vanderhoef |
| 2003/0191227 A1 | 10/2003 | Grove et al. |
| 2004/0237194 A1 | 12/2004 | McMahan |
| 2006/0070314 A1 | 4/2006 | Jenkins et al. |
| 2007/0056228 A1 | 3/2007 | Penland, Sr. et al. |

\* cited by examiner

FLOOR MATTING

This application is a continuation of U.S. patent application Ser. No. 11/105,182 filed Apr. 13, 2005 which is a continuation-in-part of U.S. patent application Ser. No. 29/203,027, filed Apr. 8, 2004 issued Nov. 21, 2006 under Pat. No. D532238, both of which are incorporated herein by reference in their entirety.

FIELD OF THE INVENTION

The present invention is directed to floor matting. More specifically, the present invention is directed to resilient floor matting which can be used in playroom environments, athletic environments such as for gymnastics or tumbling, and for environments where cushioning from the hard undersurface is desirable, such as a studio, or workplace where people are standing for prolonged periods. Artists, draftsmen, wood workers, printers, surgeons, dentists, retail sales people, and the like, are subject to standing on hard surfaces for prolonged periods.

BACKGROUND OF THE INVENTION

Resilient floor matting has been used extensively for thousands of years. Fiber matting was first used, then came carpeting. Between the 1900's and 1960's, canvas mats filled with batting were commonly used for gymnastics and tumbling. In the last two centuries, floor matting of cork has been extensively used to absorb the pounding forces of the feet on hard surfaces. In the last 30 years mats prepared from polymeric foam has become common. For purposes of convenience, such as retail sale, packaging, transportation, and the like, the mats are sold in roll form, such a 4'×8' sheets, or as tiles measuring anywhere from 6"×6" up to 3'×4'. Some floor matting tiles, especially large dimension tiles, are merely laid down with adjacent tiles butting up against one another. For smaller tiles, there is an interlocking arrangement. Some tiles have a periphery of interlocking teeth which dovetail with the peripheral teeth of adjoining tiles. Prior art tiles are one color and/or have a textured surface on one side only. The bottom surface is normally smooth and flat, and the top surface is smooth and flat or textured, depending upon the taste of the user. The prior art has attempted to make matting with one color on one side and another color on the other side, but without success. Delamination of two or more mat layers can be a problem especially with use or when there are temperature changes, such as from ambient temperature to below freezing or from ambient temperature to an elevated temperature. In addition, delamination can occur when the mats are subject to physical forces, such as with tumbling, or gymnastics, or the dropping of articles, such as weights, on the matting. In addition, running and stopping or quick turns on matting, applies shear forces to each of the layers which can lead to delamination of the layers.

With use, the working surface or top surface of the floor matting can become disfigured with stains from dirt, paint, ink, and the like, physically disfigured can cause cuts, abrasions, and indentions in the floor matting. The floor matting can be reversed but this can be unsatisfactory if the bottom surface of the matting is smooth and the top surface of the matting is textured, or vice versa. When it is reversed, the textured side becomes the base surface and the original base surface becomes the top working surface. The new working surface will not be textured.

Resilient matting, such as foam elastomeric matting, is normally anywhere from ⅜" to ¾" in thickness and around 2'×2' square. To cover a room 10'×10', 25 mat tiles are normally required.

Solid resilient matting can be quite heavy and voluminous when stacked. Polymeric foam elastomeric resilient matting is relatively light, but it is also voluminous when stacked. For example, matting (2'×2'×½") for 12'×12' coverage when stacked forms a cube 2'×2'×1½'. For retail sales, matting can take up a great deal of retail space especially when several textures and several colors are being offered. For example, if four colors are available and four textures are available, the retail outlet has to carry sixteen varieties of floor matting. The number of varieties could be cut in half by having both surfaces of the matting textured in different textures and/or different colors. Thus, if four colors are offered in four textures for polymeric foam matting, the matting on one surface having one color and one texture and the other surface having another color and another texture, only eight varieties of matting would be required at the retail outlet.

SUMMARY OF THE INVENTION

The floor matting of the present invention comprises a body having first and second layers, each layer having an outer surface and an inner surface, the inner surfaces of the first and second layers are bound together to form an inner boundary, the outer surfaces constituting a first and second surfaces of the body, the first and second surfaces being generally parallel to one another but not generally parallel to the boundary; the first and second surfaces having different surface textures or design and/or different colors, the body bounded by an interlocking peripheral wall.

The body is a planar structure and from a plan view, it can have a rectangular shape, triangular shape, square shape or hexagonal shape. The interlocking peripheral wall has a series of teeth and receiving slots in alternating positions. The teeth dovetail with the receiving slots of adjacent floor mats to lock the floor mats together.

The thickness of the body is generally constant over its width and length. This is important because it permits a plurality of floor mats to be joined together to form a continuous planar surface. Although the thickness of the body is generally constant, the thickness of the first and second layers is preferably not constant. The reason for this is that the boundary between the first layer and the second layer is undulating. If one layer was peeled away to show the boundary which follows the inner surface of the remaining layer, the topography of the boundary would look similar to rolling hills and valleys.

The undulating nonplanar boundary resists delamination of the two layers. By having an undulating boundary between the two layers, shear forces and compressive forces applied to one layer are partially converted to compressive forces and tension forces. For example, if one layer is placed in shear with respect to the other layer with an undulating boundary, in certain areas of the undulating boundary shear forces are going to be partially converted to compressive forces, and in other areas, the shear forces are going to be converted into tension forces. This helps to minimize delamination between the two layers.

DETAILED DESCRIPTION OF THE INVENTION

Figure 1:
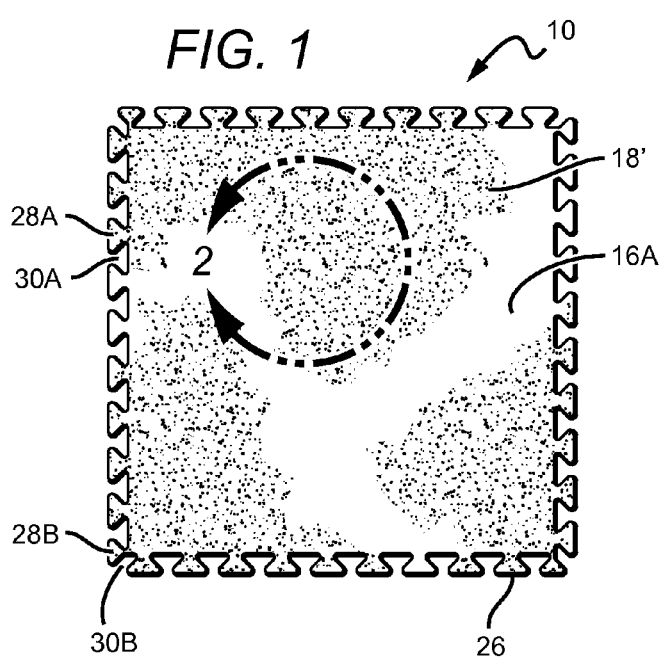
FIG. 1 is a top plan view of the floor mat of the present invention.
Figure 2:
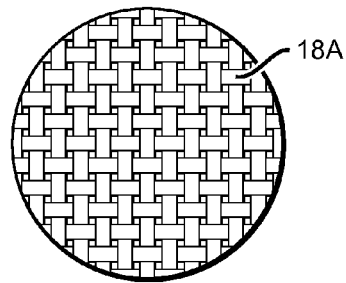
FIG. 2 shows an embossed design on the top surface of the floor mat of FIG. 1.
Figure 2A:
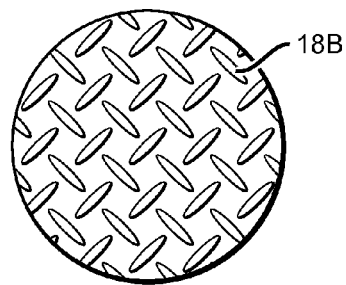
FIG. 2a shows an alternative embodiment of an embossed design on the top surface of the floor mat of FIG. 1.
Figure 3:
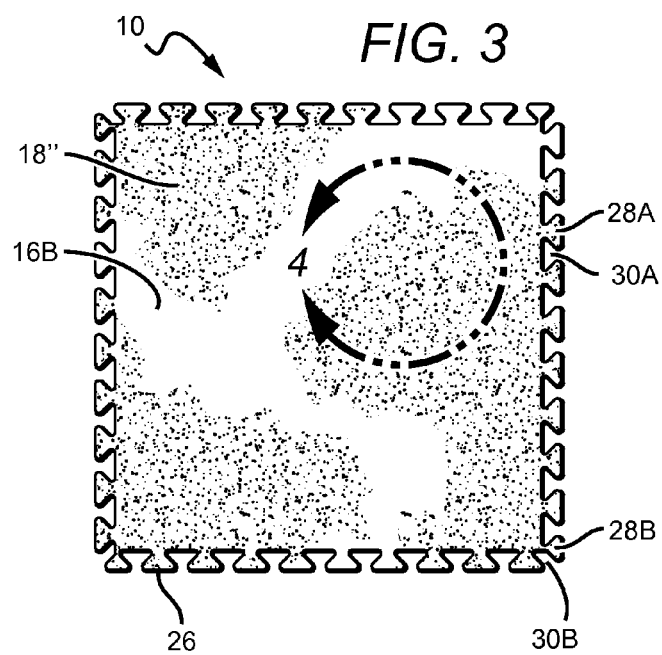
FIG. 3 is a bottom plan view of the floor mat of FIG. 1.
Figure 2B:
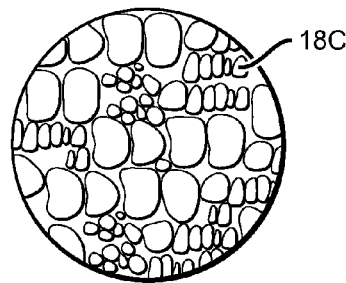
FIG. 2b is another embodiment of a design embossed in the top surface of the floor mat of FIG. 1.
Figure 4:
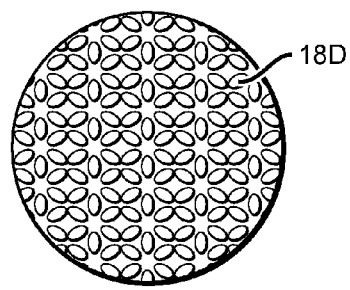
FIG. 4 shows another design embossed in the surface of the floor mat of FIG. 3.
Figure 5:
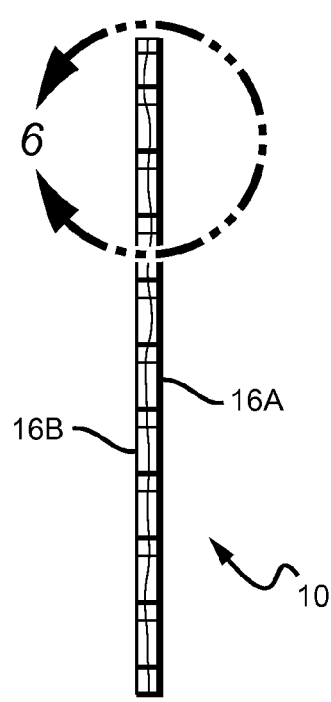
FIG. 5 shows a side view of the floor mat of FIG. 1.
Figure 6:
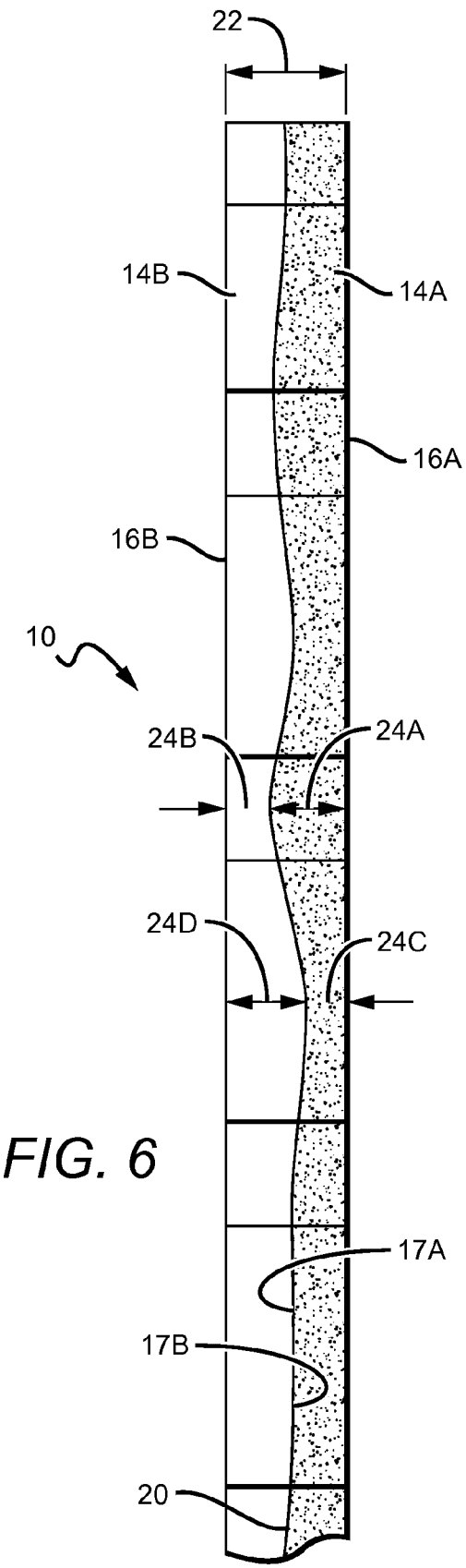
FIG. 6 is an enlargement of the side view of FIG. 5 in the encircled area labeled FIG. 6.

Referring to FIGS. 1 and 3, the floor mat 10 is a large, planar, flat, body 12 which has a first surface 16A and a second opposing parallel surface 16B. The two surfaces 16A and 16B are parallel to one another. The periphery of the floor mat is bounded by an interlocking perimeter 26. The surface 16A has a texture or three dimensional design and the second surface 16B has a texture or three dimensional design, the two textures or designs can be the same or different. For purposes of this invention, texture means a three dimensional texture or design embossed in or embossed out of the mat surface. One or both surfaces 16A and 16B can also be smooth. The body is made up of two layers 14A and 14B (see FIG. 6). The two layers are bound together either by heat welding and/or an adhesive. Preferably, the two layers have the same chemical composition so that the two layers have the same coefficient of thermal expansion and the same elastomeric properties so that the two layers work together and respond similarly when subject to temperature changes and forces. The two layers have an outer surface 16A and 16B, respectively, and two inner surfaces 17A and 17B which preferably form an undulating boundary 20 between the two layers. Preferably, the inner surfaces 17A and 17B are not parallel to the first and second surfaces. Rather, the two inner surfaces 17A and 17B in the preferred embodiment meet to form undulating boundary 20 which has a topography of rolling hills and vales. The two outer surfaces 16A and 16B are parallel, or generally parallel. In the preferred embodiment, the inner surfaces 17A and 17B are generally not parallel to either of the outer surfaces. Thus, the thickness 22 of the body is generally constant across the entire length and width of the body. In contrast, in the preferred embodiment, the thicknesses of the first layer and second layer vary as the boundary undulates. Thus, the thickness of the first and second layers vary from point to point. The thickness 24A of the first layer 14A at a given point, together with the thickness 24B of the second layer at the same point are equivalent to the thickness 22 of the body. Thus, thickness 24C of the first layer 14A, at a second point, is less than the thickness 24A at the first point and the thickness 24D of the second layer 14B at the second point is greater than the thickness 24B of the second layer at the first point. The undulating boundary between the first layer and the second layer resists delamination of the two layers making the mats more robust as explained supra. However, the two layers 14A and 14B can be flat planar layers of the same or different thickness, each having a generally uniform thickness.

As described above, the texture of the first surface 16A can be different than the texture of the second surface 16B. Similarly, the color of the first layer and the first surface 16A can be different than the color of the second layer 14B. Thus, the present mats give the purchaser the opportunity to have a selection of colors and/or a selection of textures. In addition, it permits the purchaser to form a checkerboard pattern or other pattern, assuming enough tiles are utilized, utilizing the different textures and/or colors of the mat tiles.

Preferably, the mats are made from resilient polymeric materials, such as natural or synthetic rubber, and most preferably from foam elastomeric material, such as polyethylene foam, polyurethane foam, EVA-PE foam (ethylene vinyl acetate-polyethylene foam elastomer), and EVA foam (ethylene vinyl acetate foam).

Preferably, the elastomeric mats are made from a combination of virgin polymer and recycle polymer, such as virgin EVA polymer and a mix of virgin and recycle PE (polyethylene) polymer. The blend of EVA and virgin and recycle PE are compounded together and heated to a temperature below the polymer foaming temperature and pressed into thin sheets through rollers of uniform thickness within uniform temperatures of a range of 5° C.; preferably within a range of 1° C. The sheets are 5 to 10 millimeters in thickness. Other thicknesses can be employed. The sheets are sandwiched together, normally about six sheets to each mat and placed in trays having a bottom surface with a die or mold for the texture and a top plate. The top plate may also have a die or mold for the texture for the other surface. The tray with the sandwich of layers of the raw composition and the top plate are pressed in a press and heated to a temperature to permit the elastomer to foam and expand. The press is required to keep the distance between the tray and the top plate constant to yield elastomeric foam mat of a predetermined thickness. Preferably, the three like sheets have virtually identical compositions and blend together to form one layer of the mat. The two mat layers have slightly different compositions because their respective sheets are made from different raw compositions (the differences can be slight) at different times.

The virgin PE and the recycle PE have different rates of thermal expansion and different rates of foaming. The raw compositions of the sheets are restricted in vertical movement and unrestricted in horizontal movement between the tray and the top plate in the press when heated. In the preferred embodiment, three layers of the raw composition will have one color and the other three layers of composition will have another color. Thus, one side of the mat may be red and the other side may be black, etc. The die in the bottom of the tray places one texture on one surface of the mat, and if the top plate has a die, it places a texture on the other surface of the mat. Preferably, the two textures are different although they can be the same. After the foaming reaction is completed by the heating in the press, the tray and the top plate are removed from the press and the unfinished mat is removed from the tray. The mat is allowed to cool and then it is passed to a cutting machine wherein the mat with the interlocking periphery is cut out of the unfinished mat. The mat is now complete.

In those cases where the top plate does not have a die for the texture, the mat comes out of the press with a texture only on one surface and a smooth planar other surface. The mat can be sent to a roller mill having a cool roller and a heated roller with a die attached thereto. The heated roller with die only heats the surface not having a texture permitting the heated roller with die to texture the other surface of the mat. The textured surface is kept cool by the cool roller. The mat is passed between two rollers and the roller that touches the texture surface is cool, whereas the roller with the die to give texture to the other surface is hot. The cooling roller prevents destruction or damage to the textured surface created in the press.

The above invention is not restricted to the specific embodiments disclosed herein; modifications and other embodiments of the invention are within the scope of the invention.

The invention claimed is:

1. A reversible floor matting comprising:
 a body with an interlocking peripheral wall having a plurality of teeth and a plurality of receiving slots, the body comprising a first layer and a second layer that have the same coefficient of thermal expansion;
 wherein the first layer has a first color and the second layer has a second color that is different than the first color; and
 wherein the first layer and second layer are bound together to form an undulating inner boundary therebetween.

2. The floor matting according to claim 1 wherein the body has a general overall shape selected from the group consisting of rectangular shapes, triangular shapes, square shapes, and hexagonal shapes.

3. The floor matting according to claim 1 wherein the plurality of teeth are sized and dimensioned to dovetail with a plurality of receiving slots of an interlocking peripheral wall of an adjacent floor mat, and the plurality of receiving slots are sized and dimensioned to dovetail with a plurality of teeth of an interlocking peripheral wall of the adjacent floor mat to lock the floor mats together.

4. The floor matting according to claim 1 wherein the interlocking peripheral wall has a thickness that is substantially the same as the thickness of the body.

5. The floor matting of claim 1, wherein the first layer has a first texture and the second layer has a second texture that is different than the first texture.

6. The floor matting of claim 1, wherein the first layer and the second layer have the same elastomeric properties.

7. The floor matting of claim 1, wherein the body is square and comprises a first peripheral wall, a second peripheral wall adjacent to the first peripheral wall, a third peripheral wall adjacent to the second peripheral wall, and a fourth peripheral wall adjacent to the third peripheral wall.

8. The floor matting of claim 1, wherein the first layer is formed by pressing and heating a first plurality of sheets of a first raw composition together.

9. The floor matting of claim 8, wherein the second layer is formed by pressing and heating a second plurality of sheets of a second raw composition together.

10. The floor matting of claim 9, wherein the first layer and second layer have the same chemical composition except for a different colorant.

11. The floor matting of claim 1, wherein the body is made of a foam elastomeric material.

12. The floor matting of claim 11, wherein the material comprises ethylene vinyl acetate polymer.

13. The floor matting of claim 12, wherein the material comprises polyethylene polymer.

14. The floor matting of claim 13, wherein the ethylene vinyl acetate polymer is virgin and the polyethylene polymer is recycled.

15. The floor matting of claim 1, wherein the first layer has a first texture and the second layer has a second texture that is the same as the first texture.

16. The floor matting of claim 1, wherein the first layer has a first texture and the second layer has a second texture that is different than the first texture.

* * * * *